United States Patent [19]

Hayakawa et al.

[11] Patent Number: 4,827,807
[45] Date of Patent: May 9, 1989

[54] HYDRAULIC CONTROL SYSTEM FOR FOUR-WHEEL DRIVE TORQUE TRANSFER MECHANISM FOR VEHICLE

[75] Inventors: Yoichi Hayakawa, Toyoake; Yasunobu Ito, Hoi; Takahiro Sakai, Toyota, all of Japan

[73] Assignee: Aisin Warner Kabushiki Kaisha, Aichi, Japan

[21] Appl. No.: 427,054

[22] Filed: Sep. 29, 1982

[30] Foreign Application Priority Data

Sep. 30, 1981 [JP] Japan ................................ 56-156436

[51] Int. Cl.$^4$ ...................... B60K 41/18; B60K 41/16
[52] U.S. Cl. ...................................... 74/869; 74/878; 74/866; 180/247
[58] Field of Search .................. 74/665 GA, 866, 869, 74/878; 180/247

[56] References Cited

U.S. PATENT DOCUMENTS

| 4,369,671 | 1/1983 | Matsumoto et al. | .................. 74/869 |
| 4,444,073 | 4/1984 | Moroto et al. | .................... 74/665 G |

FOREIGN PATENT DOCUMENTS

| 0143413 | 8/1980 | German Democratic Rep. | ... 74/866 |
| 2019509 | 10/1979 | United Kingdom | .................. 74/878 |

Primary Examiner—Dirk Wright
Attorney, Agent, or Firm—Blum, Kaplan

[57] ABSTRACT

A hydraulic control system for a four-wheel drive torque transfer mechanism for a vehicle, including an automatic transmission, a transfer mechanism having gear positions of a two-wheel drive direct-coupling mode $H_2$, a four-wheel drive direct-coupling mode $H_4$ and a reduced-speed four-wheel drive mode $L_4$, and a hydraulic control circuit for controlling the transmission and the transfer mechanism. The transfer mechanism includes a reduction gear mechanism, a first output shaft, a second output shaft rotationally connectible to the first output shaft through a link mechanism, a four-wheel drive clutch for releasably coupling the first and second output shafts, a direct-coupling clutch for releasably coupling an input shaft of the reduction gear mechanism with the first output shaft, and a reduction brake for setting the reducing gear mechanism in a gear train of the reduced-speed mode. The hydraulic control circuit includes an inhibitor valve which is supplied with governor pressure and which selectively applies pressurized fluid to one of the servomotors of the direct-coupling clutch and reduction brake while draining the other servomotor, the inhibitor valve feeding pressurized fluid continuedly to the servomotor of the direct-coupling clutch if manual shift of the transfer mechanism selects the mode $L_4$ when the governor pressure is higher than a predetermined level, and instead feeding pressurized fluid to the servomotor of the reduction brake and draining the servomotor of the direct-coupling clutch when the governor pressure drops below the predetermined level.

9 Claims, 4 Drawing Sheets

HYDRAULIC CONTROL SYSTEM FOR FOUR-WHEEL DRIVE TORQUE TRANSFER MECHANISM FOR VEHICLE

BACKGROUND OF THE INVENTION

This invention relates to a hydraulic control system for a four-wheel drive torque transfer mechanism for a vehicle which is coupled with an automatic transmission for switching the mode of operation between high and low positions and between two-wheel drive and four-wheel drive.

Generally, a four-wheel drive torque transfer mechanism has the gear positions (ranges) of a two-wheel drive direct-coupling mode (hereinafter referred to simply as "$H_2$" for brevity), a four-wheel drive direct-coupling mode (hereinafter referred to simply as "$H_4$" for brevity), and reduced-speed four-wheel drive mode (hereinafter referred to simply as "$L_4$" for brevity). In order to establish the respective operation modes of $H_2$, $H_4$ and $L_4$, the four-wheel drive torque transfer mechanism which is coupled with an automatic transmission is provided with selectively controlled frictionally engaging and disengaging members in the form of hydraulically operated wet multiple disc friction clutches and brakes to effect gear shifts under control of a hydraulic control system which utilizes the hydraulic pressure of a control circuit for the automatic transmission itself.

In order to prevent dangerous engine overrun and vehicle wheel locking upon shift to $L_4$ range during a high speed operation in $H_2$ or $H_4$ range, the hydraulic control system of the conventional four-wheel drive transfer mechanism which is connected to an automatic transmission is usually provided with an inhibitor valve in a conduit leading to a frictional engagement means which establishes the $L_4$ range, thereby turning on and off the conduit according to the level of the governor pressure drawn from the hydraulic control circuit of the automatic transmission. With such an arrangement, when the $L_4$ range is selected by a manual shift device, the inhibitor valve blocks the conduit if the governor pressure which is commensurate with the vehicle speed is at a high level, inhibiting a change of the transfer mechanism to $L_4$ range and permitting a change to $L_4$ range only after the governor pressure or the vehicle speed has dropped below a predetermined level, by engaging the frictional engagement means for the $L_4$ range. Once changed into the $L_4$ range, the vehicle operation remains in that range even if the governor pressure exceeds the predetermined level until the range of $H_2$ or $H_4$ is selected by the manual shift device.

However, the automatic transmissions are generally arranged to stop the output of governor pressure when the manual valve or manual shift lever is set in N (neutral) range and P (parking) range positions. Therefore, for example, if the $L_4$ range is selected by a manual shift device of the torque transfer mechanism and at the same time the manual valve of the automatic transmission is set in the N-range position during operation in the range of $H_2$ or $H_4$ of the transfer mechanism at a speed above a predetermined value, the absence of the governor pressure creates a situation as if the vehicle speed were substantially zero. Consequently, the conduit under the control of the above-mentioned inhibitor valve is turned on to set the four-wheel torque transfer mechanism in the gear position of $L_4$ range. Therefore, under these circumstances, if the manual valve is shifted to the D (drive) range position, a shift to $L_4$ range of the transfer mechanism is effected even in a high speed operation, causing engine overrun and locking of vehicle wheels which may lead to a dangerous slip accident.

SUMMARY OF THE INVENTION

Generally speaking, the present invention contemplates to provide a hydraulic control system which is particularly suitable for protecting a torque transfer mechanism and which can preclude the dangerous slips as caused by engine overrun and vehicle wheel locking. More particularly, the present invention relates to a hydraulic control system for a four-wheel drive torque transfer mechanism which can selectively establish a two-wheel drive direct-coupling gear $H_2$, a four-wheel drive direct-coupling gear $H_4$, or a reduced-speed four-wheel drive range $L_4$.

According to the present invention, the hydraulic control system for the four-wheel drive torque transfer mechanism includes: an automatic transmission; a torque transfer mechanism coupled with the automatic transmission and having a reduction gear mechanism; means for detecting the selected position of the manual shift valve of the automatic transmission and generating a predetermined output signal indicative of the selected position; a manual shift device for the torque transfer mechanism; a valve means for selectively changing the torque transfer mechanism into a two-wheel drive direct-coupling gear $H_2$, a four-wheel drive direct-coupling gear $H_4$ or a reduced-speed four-wheel drive gear $L_4$ by operation of the manual shift device; vehicle speed detecting means adapted to generate an output signal commensurate with the vehicle speed; and means for controlling the valve means in response to the signal of the selected position of the manual shift lever (manual selector valve) of the automatic transmission.

More particularly, the automatic transmission includes a transmission gear train capable of establishing at least three forward speed gears and one reverse gear, and the torque transfer mechanism includes: an input shaft coupled with the output shaft of the transmission gear train; a reduction gear mechanism provided between the input shaft and a first output shaft; a direct-coupling frictional engagement means for coupling the input shaft directly with the first output shaft without intervention of the reduction gear mechanism; reduced-speed drive frictional engagement means for changing the reduction gear mechanism into a reduced-speed mode; a second output shaft rotationally connected with the first output shaft through a link mechanism and four-wheel drive frictional engagement means. The above-mentioned valve means includes a first control valve means for controlling a hydraulic servomotor of the direct-coupling frictional engagement means, and a second control valve means for controlling hydraulic servomotors of the reduced-speed drive frictional engagement means and the four-wheel drive frictional engagement means. The second control valve means is further controlled by a vehicle speed signal. The control means for the above-mentioned valve means further includes first and second solenoid valves which generate output signals for controlling the first and second control valve means in response to the signal of the manually selected shift position of the torque transfer mechanism.

Accordingly, it is an object of the present invention to provide an improved hydraulic control system for four-wheel drive torque transfer mechanism of motor vehicle, which prevents wrong operation of the transfer mechanism when the manual shift of the automatic transmission is changed into D (drive) range after being once shifted to N (neutral) or P (parking) range during a high speed operation above a predetermined speed, thereby ensuring smooth operation of the vehicle.

Another object of the present invention is to provide a hydraulic control system in which, in order to prevent the above-mentioned dangerous situations, when the governor pressure is dropped to zero level upon changing the manual shift of the automatic transmission to N (neutral) or P (parking) range, the hydraulic control system of the transfer mechanism is constantly supplied with a signal from a detecting means which generates a signal of the shift to P- or N-range of the automatic transmission irrespective of the position of the manual shift of the transfer mechanism, thereby setting the gear position of the transfer mechanism in the two-wheel drive direct-coupling mode or four-wheel drive direct-coupling mode. Therefore, in a case where the manual shift of the transfer mechanism is set in $L_4$ range during a high speed operation while the manual shift of the automatic transmission is set in the D-range position through the N-range position which stops the supply of the governor pressure, the transfer mechanism is not changed into the gear position of $L_4$ range (reduced-speed four-wheel drive mode), thus prohibiting the change to the reduced-speed four-wheel drive mode $L_4$ in a high speed operation in a reliable manner.

The gist of the present invention resides in a hydraulic control system for a four-wheel drive torque transfer mechanism for a vehicle to be coupled to the output end of an automatic transmission for selectively establishing one of three modes of operation of two-wheel drive direct-coupling, four-wheel drive direct-coupling and reduced-speed four-wheel drive, the control system including: a detection means for detecting the selected gear position of the manual shift of the automatic transmission; speed detection means adapted to generate an output signal indicative of the vehicle speed; a shift control means for controlling the shift of the transfer mechanism to four-wheel drive direct-coupling range or to reduced speed four-wheel drive range according to the level of the signal from the speed detection means when the mode of reduced-speed four-wheel drive is selected by the manual shift of the four-wheel drive transfer mechanism; control means for shifting the transfer mechanism to two-wheel drive direct-coupling range or four-wheel drive direct-coupling range, if in the reduced-speed mode, in response to the signal of N- or P-range from the shift position detection means when the vehicle speed signal becomes absent upon selection of N (neutral) or P (parking) range by the manual shift of the automatic transmission; thereby maintaining the mode of four-wheel drive direct-coupling during a high speed operation of the vehicle in excess of a predetermined speed in response to the vehicle speed signal in spite of selection of the reduced-speed four-wheel drive mode by the manual shift of the transfer mechanism, or shifting the transfer mechanism into the reduced-speed four-wheel drive range when the vehicle speed is lower than the predetermined value; once shifted to the reduced-speed four-wheel drive range, the transfer mechanism being maintained in that gear position even after the vehicle speed exceeds the predetermined speed level, and shifting into the gear position of two-wheel drive direct-coupling range or four-wheel drive direct-coupling range when the mode of two-wheel drive direct-coupling or reduced-speed four-wheel drive is selected by the manual shift.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which.

DESCRIPTION OF PREFERRED EMBODIMENTS

Figure 2:
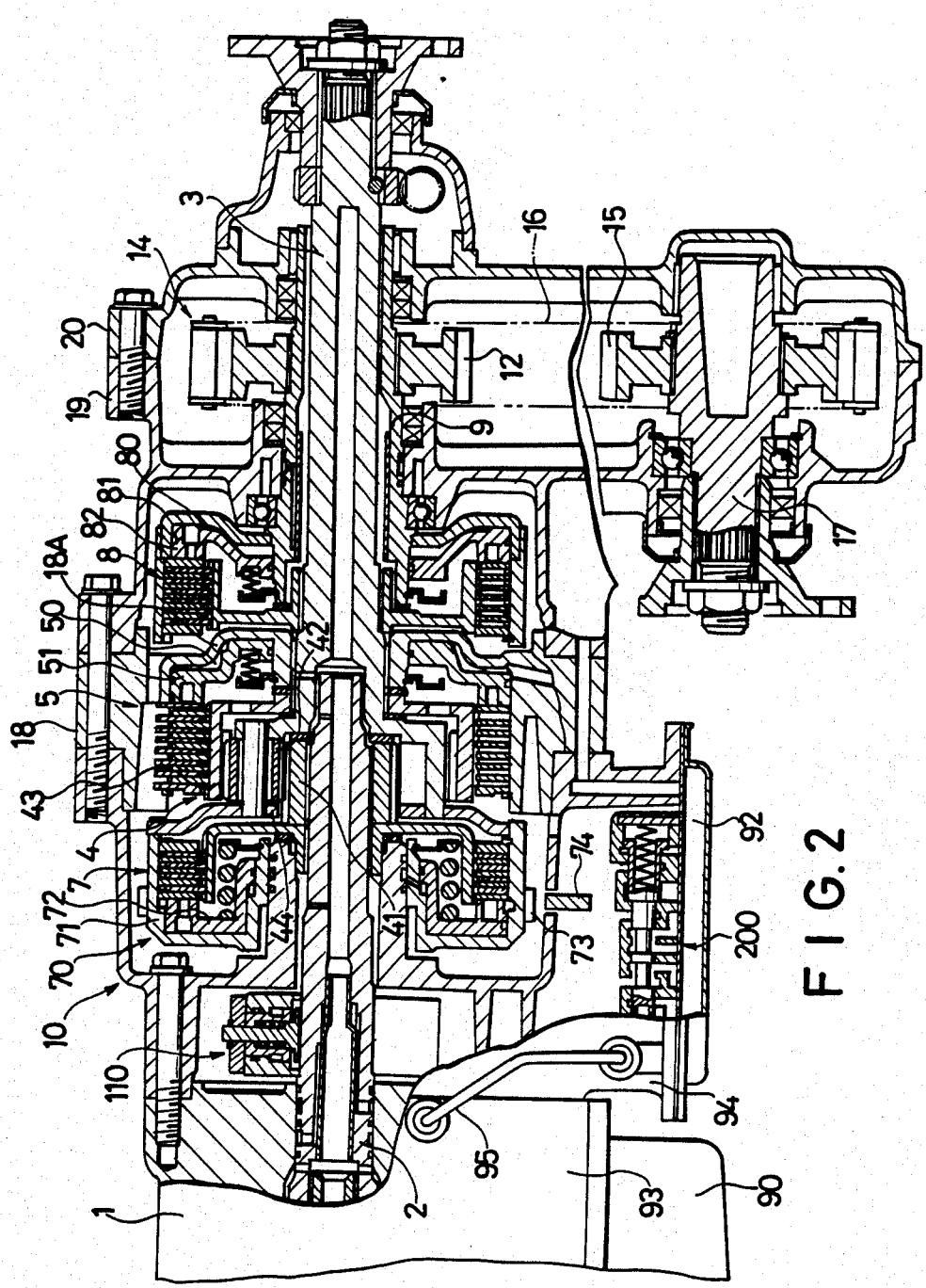
FIG. 2 is a schematic sectional view of the automatic transmission and transfer mechanism.

Hereafter, the invention is illustrated more particularly by way of the preferred embodiments shown in the drawings, in which generally indicated at 1 is a transmission gear assembly of the automatic transmission and at 10 a torque transfer mechanism which is connected to the output end (the right end in FIG. 2) of the transmission gear assembly through a shaft 2 which serves as an output shaft of the transmission gear assembly 1 and at the same time as an input shaft of the torque transfer mechanism 10. Denoted at 3 is a first output shaft of the transfer mechanism 10, which is located behind the input shaft 2 (on the right side in FIG. 2) in series therewith, at 110 a governor valve which is securely mounted on the input shaft 2, and at 4 a planetary gear set including a sun gear 41 which is secured by a spline on a rear portion of the input shaft 2, planetary pinions 42 in meshing engagement with the sun gear 41, a ring gear 43 in meshing engagement with the planetary pinions 42, and a carrier 44 rotatably retaining the planetary pinions 42 and coupled with the fore end of the first output shaft 3 of the transfer mechanism. Designated at 5 is a friction brake for engaging and disengaging the ring gear 43 with a transfer case 94, and at 50 a hydraulic servomotor for the brake 5, which is constituted by a cylinder 18A formed in the transfer case 18 and a piston 51 slidably fitted in the cylinder 18A. The sun gear 41 and carrier 44 are coupled and uncoupled by a hidraulic servomotor 7 which is at one end of the planetary gear set 4 on the side of the transmission gear assembly and which is constituted by a cylinder 71 connected to the carrier 44 and a piston 72 fitted in the cylinder 71. Denoted at 8 is a friction clutch for engaging and disengaging the first output shaft 3 and a sleeve 9 connected to one sprocket wheel 12 of a link mechanism which drives the other output shaft of the transfer mechanism as will be described hereinafter. The reference numeral 80 indicates a hydraulic servomotor constituted by a cylinder 81 welded to the sleeve 9, which is rotatably retained in the transfer cases 19 and 20, and a piston 82 slidably fitted in the cylinder 81. Further designated at 17 is the second output shaft of the transfer mechanism, and at 14 a link mechanism which is constituted by the sprocket wheel 12 secured by a spline to the sleeve 9, a sprocket wheel 15 secured by a spline to the second output shaft 17, and a chain 16 lapped between and around the two sprocket wheels.

Provided around the circumference of the hydraulic cylinder 71 of the friction clutch 7 is a parking gear 73 with which a stopper 74 is engaged when the shift lever of the automatic transmission is put in the parking position, thereby fixing the first output shaft 3.

Indicated at 90 is an oil pan of the automatic transmission, at 200 a hydraulic control system which controls the oil pressure flows to and from the hydraulic servomotors 70, 80 and 50 of the clutches 7 and 8 and the brake 5 of the four-wheel transfer mechanism 10, and at 92 an oil pan of the hydraulic control system 200. The oil pressure to be supplied to the hydraulic servomotors of the clutches 7 and 8 and brake 5 is fed through a pipe 94 which is supported on a case 93 of the automatic transmission and a transfer case 94 and through the hydraulic control system 200 from the oil pan 90.

Figure 1:
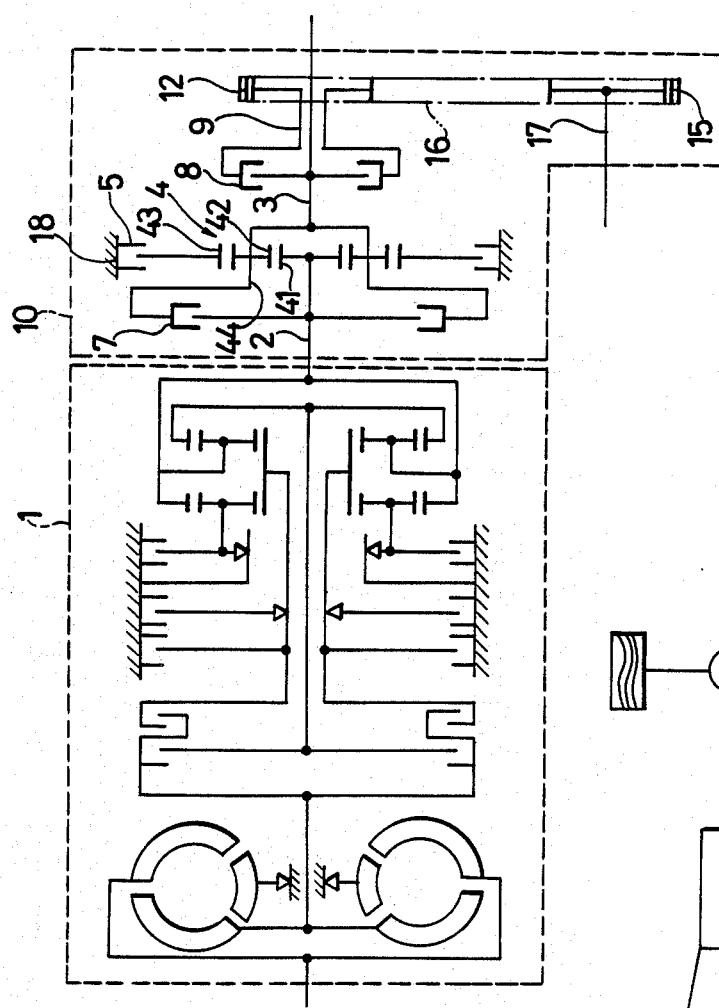
FIG. 1 is a skeletal view of a automatic transmission and a torque transfer mechanism for a vehicle which the present invention concerns.
Figure 3:
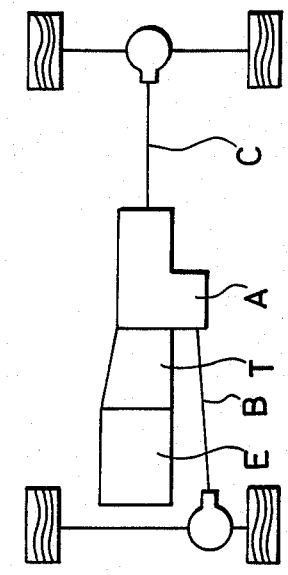
FIG. 3 is a schematic illustration of a power transmission system of motor vehicle.

As indicated at A in FIG. 3, the transfer mechanism is assembled with an automatic transmission T which is connected to an internal combustion engine E of a motor vehicle, with its first output shaft 3 connected to a rear wheel propeller shaft and the other or the second output shaft 17 to a front wheel propeller shaft B. In a normal cruising operation, the line pressure which is supplied to the hydraulic control circuit of the automatic transmission is fed to the hydraulic servomotor 70 to engage the clutch 7, while the hydraulic servomotors 50 and 80 are drained to hold the brake 5 and clutch 8 in released state. Consequently, the sun gear 41 and carrier 44 of the planetary gear set 4 are coupled to transmit power to the first output shaft 3 from the input shaft 2 in a reduction ratio of 1 for operation in rear two-wheel drive. In this instance, the power from the input shaft 2 is transmitted to the first output shaft 3 from the carrier 44 through clutch 7, by-passing the gears 41 to 43 which therefore receive no load on their tooth faces and can have a prolonged service life. If it is desired to switch the mode of operation from two-wheel drive to four-wheel drive, a selector lever or switch which is provided in the driver's cabin is manipulated for manual shift, actuating the hydraulic control system 200 of the transfer mechanism whereupon the line pressure is supplied gradually to the hydraulic servomotor 80 to engage the clutch 8 smoothly. As a result, the first output shaft 3 is connected with the sleeve 9 to transmit the power also to the front wheels through the link mechanism 14, second output shaft 17 and propeller shaft B to operate the vehicle in the four-wheel drive mode transmitting the power of the input shaft 2 in a reduction ratio of 1 to the first output shaft 3 which drives the front wheels as well as to the second output shaft 17 which drives the rear wheels. If a greater output torque is required for hill climbing or other reasons during operation in the four-wheel drive mode, the oil pressure to the hydraulic servomotors actuates an inhibitor valve 240, a downshift timing valve 260 and a check valve 320 to supply the line pressure gradually to the hydraulic servomotor 50 while draining the oil pressure of the hydraulic servomotor 70, thereby gradually engaging the brake 5 and at the same time releasing the clutch 7 smoothly. As a result, the sun gear 41 and carrier 44 are released and the ring gear 43 is held stationary, so that the rotation of the input shaft 2 is transmitted to the first and second output shafts 2 and 17 after reduction through the sun gear 31, planetary pinions 42 and carrier 44 to establish a four-wheel drive operation of a greater torque. Table 1 below shows the positions of the manual shift of the transfer mechanism in relation with the engaged or released states of the brake 5 and clutches 7 and 8 and the mode of operation.

TABLE 1

| Manual Shift | Mode of Operation | Frictional Engagement Means | | | Reduction Ratio |
|---|---|---|---|---|---|
| | | 5 | 7 | 8 | |
| H₂ range | Two-wheel drive | X | O | X | 1 |
| H₄ range | Four-wheel drive direct-coupling | X | O | O | 1 |
| L₄ range | Four-wheel drive direct-coupling | X | O | O | 1 |
| | Reduced-speed four-wheel drive | O | X | O | $\frac{1+\lambda}{\lambda} = 3.0$ |

In Table 1, the marks "O" and "X" indicate the engaged and released states of the frictional engagement means, respectively. The symbol "λ" in the reduction ratio represents the ratio in the number of teeth of the sun gear 41 to the ring gear 43, and is regarded as 0.5 in the example shown in Table 1.

Figure 4:
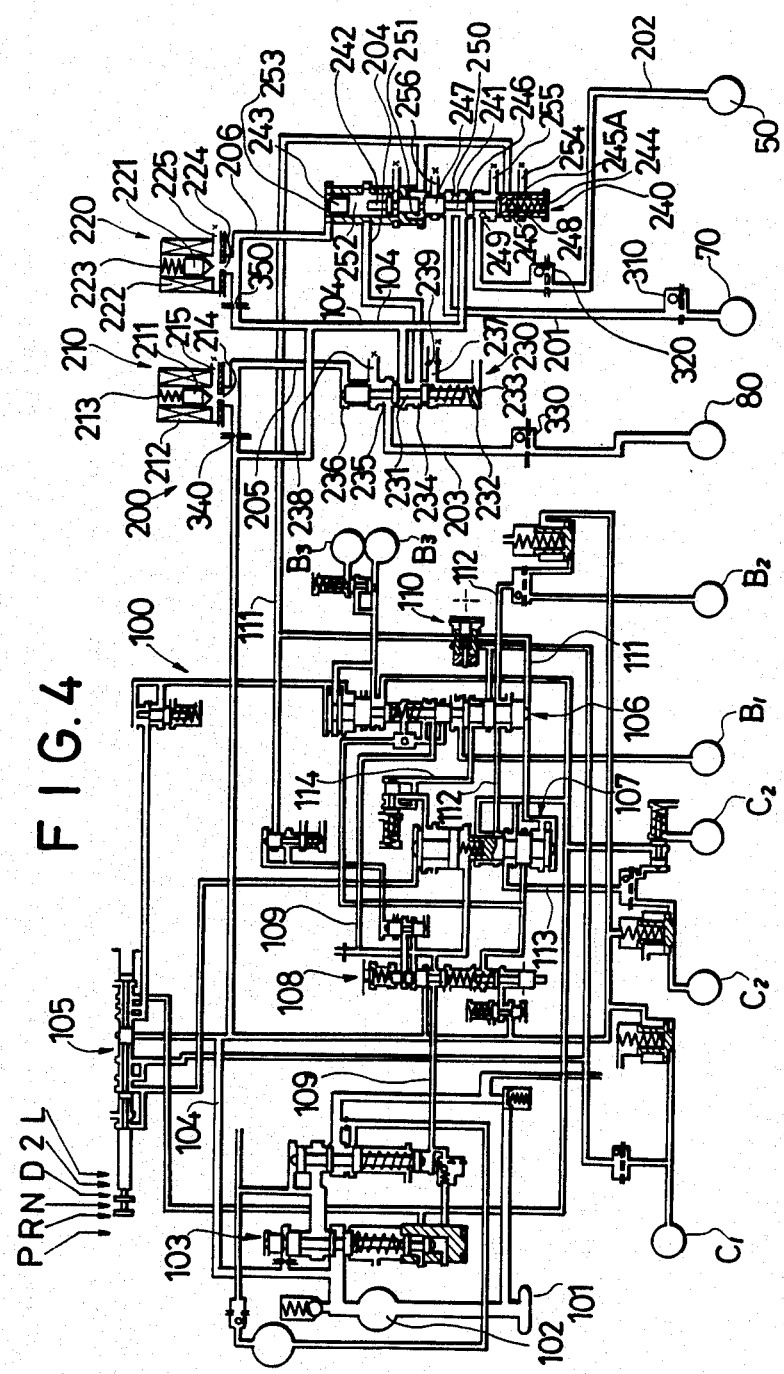
FIG. 4 is a circuit diagram of a hydraulic control system for a four-wheel drive torque transfer mechanism according to the present invention, as coupled with an automatic transmission with three forward speed positions and one reverse position.

Referring now to FIG. 4, the hydraulic control system for four-wheel drive torque transfer mechanism according to the present invention is hereafter described more particularly by way of a case where it is connected to an automatic transmission with three forward speed positions and one reverse position.

In the figure, generally designated by the reference numeral 100 is an example of known automatic transmission with three forward speed gears and one reverse gear, in which the oil taken up from an oil sump 101 by an oil pump 102 is regulated into a predetermined pressure (line pressure) at the pump output by a regulator valve 103 and delivered to a conduit 104. The oil pressure inputted to the conduit 104 is fed to a 1-2 shift valve 106 and a 2-3 shift valve 107 through a manual selector valve 105. Indicated at 108 is a throttle valve which generates an oil pressure (throttle pressure) in a conduit 109 commensurate with the degree of throttle opening. Indicated at 110 is a governor valve which generates an oil pressure (governor pressure) commensurate with the vehicle speed in a conduit 111.

The 1-2 shift valve 106 and 2-3 shift valve 107 open and close the conduits 112 to 114 according to the level of the throttle and governor pressures supplied through the conduit 109 and 111, thereby controlling the supply and discharge of oil pressure to and from the hydraulic servomotors $C_1$, $C_2$ and $B_1$ to $B_3$ of the clutches and brakes.

In the particular embodiment shown, the oil pressure is supplied to the hydraulic servomotor $C_1$ in the forward 1st speed range, to the hydraulic servomotors $C_1$ and $B_2$ in the forward 2nd speed range, to hydraulic servomotors $C_1$, $C_2$ and $B_2$ in the forward 3rd speed range, and to the hydraulic servomotors $C_2$ and $B_3$ in the reverse range.

The hydraulic control system 200 for the four-wheel drive torque transfer mechanism includes a first solenoid valve 210, a second solenoid valve 220, a change-over valve 230, an inhibitor valve 240, downshift timing valve 260, a first conduit 201 communicating with the hydraulic servomotor 70 for the direct-coupling frictional engagement means or the multiple disc clutch 7, a second conduit 202 communicating with the hydraulic servomotor 50 for the reduced-speed drive frictional engagement means or the multiple disc brake 5, a third conduit 203 communicating with the hydraulic servomotor 80 for the four-wheel drive frictional engagement means or the multiple disc clutch 8, a modulator valve 270 provided in the third conduit 203, a fourth conduit 204 communicating the change-over valve 230 with a predetermined oil chamber of the inhibitor valve 240, check valves 310, 320 and 330 provided in the first to third conduits, respectively, and conduit 205 of the first solenoid pressure and a conduit 206 of the second solenoid pressure communicating with conduit 104 through orifices 340 and 350, respectively.

The first and second solenoid valves 210 and 220 consist of a moving core 211 or 221, a solenoid 212 or 222, a spring 213 or 223, an opening 214 or 224 and a drain port 215 or 225, respectively. Upon energizing the solenoids 212 and 222, the moving cores 211 and 221 are moved in upper positions shown in the drawing to uncover the openings 214 and 224 to drain through the drain ports 215 and 225 the oil pressure in the conduits 205 and 206 which are partitioned off from conduit 104 by the orifices 340 and 350, respectively. When the solenoids 212 and 222 are in de-energized state, the moving cores 211 and 222 are displaced downward from the upper positions of FIG. 4 into the respective lower positions by the action of the springs 213 and 223 to close the openings 214 and 224 to generate a solenoid pressure of high level (line pressure) in the conduits 205 and 206.

As shown in FIG. 4, the inhibitor valve 240 is provided with three spools 241, 242 and 243 which are designated as first, second and third spools from the lower ones. The first spool 241 is provided with a spring-loaded sleeve-like land 245 at its lower end in addition to two lands 246 and 247, and formed with a lower oil chamber 248, first and second intermediate oil chambers 249 and 250 defined between the sleeve-like land 245 and the lands 246 and 247, an oil chamber 251 defined between the first and second spools 241 and 242, an oil chamber 252 defined between the second and third spools 242 and 243, and an upper oil chamber 253. When the first spool 241 of the inhibitor valve 240 is located in an upper position, above the illustrated position in FIG. 4, the lower oil chamber 248 is communicated with the governor pressure conduit 111 through an oil port 245A in the sleeve-like and 245, the first intermediate oil chamber 249 communicates the line pressure conduit 104 with the second conduit 202, and the second intermediate oil chamber 250 communicates the first conduit 201 with the drain port 256 or a fifth conduit 207. On the other hand, when the first spool 241 is held in the lower position shown, the lower oil chamber 248 communicates with the drain port 254 through the oil port 245A in the sleeve-like land 245, the first intermediate oil chamber 249 communicates the second conduit 202 with the drain port 255, and the second intermediate oil chamber 250 communicates the line pressure conduit 104 with the first conduit 201. The oil chamber 251, oil chamber 252 and upper oil chamber 253 are constantly in communication with the governor pressure conduit 111, the fourth conduit 204 and the conduit 206, respectively.

The change-over valve 230 is loaded with a biasing spring 232 as seen in the drawing on the lower end portion of a spool 231 which is provided with three lands, defining a lower oil chamber 233, a first intermediate oil chamber 234, a second intermediate oil chamber 235 and an upper oil chamber 236 from the lower ones. If the solenoid pressure of high level is applied to the upper oil chamber 236 which is in communication with conduit 205 of the first solenoid pressure, the spool 231 is displaced downward from the illustrated position in the drawing to assume a lower position, communicating the line pressure conduit 104 with the third conduit 203 through the second intermediate oil chamber 235 to supply the line pressure to the hydraulic servomotor 80 of the clutch 8, and communicating the fourth conduit 204 with a drain port 237 provided with an orifice 239 through the first intermediate oil chamber 234 to drain the oil chamber 252 of the inhibitor valve 240. If the solenoid pressure applied to the upper chamber 236 turns to low level, the spool 231 is displaced into the upper position as shown in the drawing by the action of the spring 232, communicating the line pressure conduit 104 with the fourth conduit 204 through the first intermediate oil chamber 234 to supply line pressure to the oil chamber 252 of the inhibitor valve 240, and communicating the third conduit 203 with a drain port 238 through the second intermediate chamber 235 to drain the hydraulic servo 80.

If the range of $H_2$ or $H_4$ or $L_4$ is selected by manipulation of a manual shift (a selector switch in this particular embodiment) which is provided in the driver's cabin, the first and second solenoid valves 210 and 220 are turned on or off as shown in Table 2 by the operation of an electric control circuit which will be described hereinafter, selectively supplying the operating oil pressure from the hydraulic control system of the torque transfer mechanism to the hydraulic servomotors 50, 70 and 80 of the respective frictional engagement means to change the transfer mechanism 10 into the gear position of the selected mode ($H_2$ or $H_4$ or $L_4$). In the above-described hydraulic circuit arrangement, if the first solenoid valve 210 is turned on, the transfer mechanism 10 is set in the gear position of $H_2$ mode irrespective of the on- or off-state of the second solenoid valve 220.

Table 2 below shows the on- and off-states of the first and second solenoid valves 210 and 220 in relation with the selected range of manual shift and the transfer gear position, wherein the symbol "ON" and "OFF" represent the energization and de-energization of the solenoid valve, respectively.

TABLE 2

| Manual valve selected range | Transfer manual shift | Solenoid valve 210 | Solenoid valve 220 | Gear position |
|---|---|---|---|---|
| D.2.L. | $H_2$ range | ON | OFF | $H_2$ |
|  | $H_4$ range | OFF | OFF | $H_4$ |
|  | $L_4$ range | OFF | ON | $H_4/L_4$ |
| N.P. | $H_2$ range | ON | OFF | $H_2$ |
|  | $H_4$ range | ON | OFF | $H_2$ |
|  | $L_4$ range | ON | ON | $H_2$ |

As clear from Table 2, upon energization of the first solenoid valve 210, the line pressure which is led from conduit 104 to conduit 205 through orifice 340 is drained through the drain port 215 to hold the spool 231 of the change-over valve 230 in the upper position shown, so that the oil pressure in the hydraulic servomotor 80 of the multiple disc clutch 8 is drained through the drain port 238 to release the clutch 8. The release of the multiple disc clutch 8 results in disconnection of the first output shaft 3 from the sleeve 9, namely, disconnection of the first output shaft 3 from the second output shaft 17, putting the transfer mechanism in the gear position of two-wheel drive mode. At the same time, the line pressure from conduit 104 is applied to the oil chamber 252 of the inhibitor valve 240 through the oil chamber 234 and the fourth conduit 204 to shift the first and second spools 241 and 242 of the inhibitor valve 240 into the respective lower positions shown, so that the line pressure of conduit 104 is fed to the hydraulic servomotor 70 through the oil chamber 250, first conduit 201 and check valve 310 to engage the multiple disc clutch 7, while the oil pressure in the hydraulic servomotor 50 is drained from the drain port 255 through the conduit 202 and oil chamber 249 to release the brake 5. As a result, the transfer mechanism 10 is held in the gear position of two-wheel drive direct-coupling range.

When the first solenoid valve 210 is de-energized state, the line pressure of the conduit 104 is led to the conduit 205 through orifice 340, however, since the opening 214 of the first solenoid valve 210 is closed, it is admitted into the upper oil chamber 236 of the change-over valve 230, displacing the spool 231 into the lower position. Consequently, the line pressure of the conduit 104 is fed to the hydraulic servomotor 80 through the second intermediate oil chamber 235, third conduit 203 and check valve 330 to engage the multiple disc clutch 8. The engagement of the multiple disc clutch 8 connects the first output shaft 3 with the second output shaft 17 through the link mechanism to put the transfer mechanism in the gear position of four-wheel drive direct-coupling range. The communication between the fourth conduit 204 and 104 is blocked, the line pressure is not led in the oil chamber 252 of the inhibitor valve 240. Under these circumstances, if the second solenoid valve 220 is in de-energized state, the line pressure of the conduit 104 is admitted into the upper oil chamber 253 of the inhibitor valve 240 through orifice 350 and conduit 206 to shift the third spool 243 of the inhibitor valve 240 into the lower position, holding the second and first spools 242 and 241 also in the respective lower positions. Accordingly, the line pressure is fed from the conduit 104 to the hydraulic servomotor 70 through the conduit 201 and check valve 310 to engage the multiple disc clutch 7, while the oil pressure in the hydraulic servomotor 50 is drained from the drain port 255 through the conduit 202 and oil chamber 249 to release the multiple disc brake 5, holding the transfer mechanism 10 in gear the position of $H_4$ (4-wheel drive direct-coupling) range.

If the second solenoid valve 220 is energized with the first solenoid valve 210 in de-energized state, the line pressure which is fed from the conduit 104 to conduit 206 through the orifice 350 is drained through the opening 224 and drain port 255, without being admitted into the upper oil chamber 253 of the inhibitor valve 240. Further, the first solenoid valve 210 is in de-energized state, so that no line pressure is supplied to the oil chamber 252 from the fourth conduit 204. The pressure receiving surface at the upper end of the first spool 241 of the inhibitor valve 250, which faces the oil chamber 251, has the same area as the pressure receiving surface at the lower end which faces the lower oil chamber 248. Therefore, in a case where the first spool 241 is in the lower position shown, namely, in the gear position of $H_4$ (4-wheel drive direct-coupling) range where the multiple disc clutch 7 is in engaged state and the multiple disc brake 5 is in released state, the first spool 241 is continuedly held in the lower position overcoming the force of the spring 244 to maintain the transfer mechanism in the gear position of $H_4$ (4-wheel drive direct coupling) range as long as the governor pressure supplied to the oil chamber 251 from the conduit 111 is greater than a predetermined level. However, if the governor pressure drops below the predetermined value, the first spool 241 is shifted into the upper position by the action of the spring 244, so that the governor pressure from the conduit 111 is also admitted into the lower oil chamber 248 through the oil port 245A of the sleeve-like land 245, retaining the first spool 241 in the upper position irrespective of variations in the governor pressure (i.e., in vehicle speed) thereafter. With the first spool 241 held in the upper position, the line pressure in conduit 104 is fed to the hydraulic servomotor 50 through the oil chamber 249, second conduit 202 and check valve 320 to engage the multiple disc brake 5, while the oil pressure in the hydraulic servomotor 70 is drained through conduit 201, oil chamber 250 and drain port 256 or the fifth conduit 207 to release the multiple disc clutch 7. Consequently, the transfer mechanism 10 is held in the gear position of $L_4$ range (reduced-speed four-wheel drive mode).

Namely, if the second solenoid valve 220 is energized when the first solenoid valve 210 is de-energized state and the governor pressure or the vehicle speed is lower than a predetermined value, the transfer mechanism 10 is immediately changed into the gear position of $L_4$ range (reduced-speed four-wheel drive mode). However, if the second solenoid valve 220 is energized when the governor pressure or the vehicle speed is higher than the predetermined value, the transfer mechanism 10 retains the gear position of $H_4$ (four-wheel drive direct-coupling) range until the governor pressure becomes lower than the predetermined value, and the transfer mechanism 10 is changed into the gear position of $L_4$ range after the governor pressure drops below the predetermined value.

Now, the operations are described in connection with the respective ranges which are selected by the manual valve 105 of the automatic transmission and the manual shift of the transfer mechanism.

(1) Where the manual valve 105 in D-, 2-, L- or R- range position, in which the governor pressure commensurate with vehicle speed is fed to the valve means:

(A) When the manual shift is in $H_2$ range and the transfer mechanism is in the gear position of $H_2$ range (two-wheel drive direct-coupling mode),
the 1st solenoid valve 210 is "ON", and
the 2nd solenoid valve 220 is "OFF"

so that the line pressure in conduit 104 which is led to conduit 205 through orifice 340 is drained by the de-energized first solenoid valve 210, without being admitted into the upper oil chamber 236 of the change-over valve 230. Therefore, the spool 231 of the change-over valve 230 is held in the upper position by the spring 232, and the line pressure from conduit 104 is applied to the oil chamber 252 through the oil chamber 234 and fourth conduit 204, holding the second and first spools 242 and 241 of the inhibitor valve 240 in the respective lower positions. Consequently, the line pressure is fed to the hydraulic servomotor 70 of the clutch 7 from the conduit 104 through the oil chamber 250, first conduit 201 and check valve 310, while the oil pressures in the hydraulic servomotors 80 and 50 are drained through the drain ports 238 and 255, respectively. Thus, the transfer mechanism 10 is set in the gear position of $H_2$ range (two-wheel drive direct-coupling mode).

(B) When the manual shift is in $H_4$-range and the transfer mechanism is in the gear position of $H_4$ range (four-wheel drive direct-coupling mode),
the 1st solenoid valve 210 is "OFF", and
the 2nd solenoid valve 220 is "OFF"

so that the line pressure in the conduit 104 is led to the conduit 205 through orifice 340. However, since the first solenoid valve 210 is in de-energized state, the line pressure is admitted into the upper oil chamber 236 of the change-over valve 230, holding the spool 231 in the lower position. Consequently, the line pressure from the conduit 104 is fed to the hydraulic servomotor 80 of the clutch 8 through the second intermediate oil chamber 235, check valve 330, modulator valve 270 and third conduit 203. On the other had, the line pressure which is also led to the conduit 206 from the conduit 104 through orifice 350 is admitted into the upper oil chamber 253 since the second solenoid valve 220 is in de-energized state, holding the third, second and first spools 243, 242 and 241 of the inhibitor valve 240 in the respective lower positions. Therefore, the line pressue is fed to the hydraulic servomotor 70 of the clutch 7, and the oil pressure in the hydraulic servomotor 50 is drained through the drain port 255. Thus, the transfer mechanism 10 is set in the gear position of $H_4$ range (four-wheel drive direct-coupling mode).

(C) When the manual shift is in $L_4$-range with a vehicle speed higher than a predetermined value, and the transfer mechanism is in the gear position of $H_4$ range (four-wheel drive direct-coupling mode),
the 1st solenoid valve 210 is "OFF", and
the 2nd solenoid valve 220 is "ON"

so that the line pressure of the conduit 104 which is led into the conduit 205 through orifice 340 prevails in the upper oil chamber 236 since the first solenoid valve 210 is in de-energized state, holding the spool 231 of the change-over valve 230 in the lower position. Accordingly, the line pressure is fed to the hydraulic servomotor 80 of the clutch 8. On the other hand, the line pressure which is also led into the conduit 206 from the conduit 104 through the orifice 350 is drainded by the energized second solenoid valve 220, so that it is not admitted into the upper oil chamber 253 of the inhibitor valve 240. Also, the line pressure is not fed into the oil chamber 252 because the spool 231 of the change-over valve 230 is in the lower position. As the governor pressure prevails in the oil chamber 251, the second and third spools 242 and 243 are shifted to the respective upper positions. The governor pressure is in excess of the predetermined level, so that the first spool 241 is held in the lower position shown, overcoming the force of the spring 244. Therefore, the line pressure is fed to the hydraulic servomotor 70 of the clutch 7, and the oil pressure in the hydraulic servomotor 50 is drained through the drain port 255. Thus, the transfer mechanism 10 is set in the gear position of $H_4$ range (four-wheel drive direct-coupling mode).

(D) When the manual shift is in $L_4$-range with a vehicle speed lower than the predetermined value and the transfer mechanism is in the gear position of $L_4$ range (reduced-speed four-wheel drive mode),
the 1st solenoid valve 210 is "OFF", and
the 2nd solenoid valve 220 is "ON"

so that the line pressure which is led from the conduit 104 into the conduit 205 through orifice 340 is admitted into the upper oil chamber 236 since the first solenoid valve 210 is in de-energized state, setting the spool 231 of the change-over valve 230 in the lower position shown. Consequently, the line pressure is fed into the hydraulic servomotor 80 of the clutch 8. On the other hand, the line pressure which is also led from the conduit 104 to the conduit 206 through orifice 350 is drained by the energized second solenoid valve 220. The line pressure is thus not admitted into the upper oil chamber 253 of the inhibitor valve 240. Also the line pressure is not fed into the oil chamber 252. In this instance, the governor pressure prevails in the oil chamber 251, the second and third spools 242 and 243 are shifted to the respective upper positions, and, since the governor pressure is lower than the predetermined level and overcome by the force of the spring 244, the first spool 241 is held in the upper position, admitting the governor pressure into the lower oil chamber 248 through the oil port 245A in the sleeve. Therefore, the line pressure is fed to the hydraulic servomotor 50 of the multiple disc brake 5 from the conduit 104 through oil chamber 249, second conduit 202 and check valve 320, while the oil pressure in the hydraulic servomotor 70 is drained through the first conduit 201, second intermediate oil chamber 250 and drain port 256, or through the oil chamber 250, intermediate oil chamber 264 of the downshift timing valve 260 and drain ports 266 and 268. Thus, the transfer mechanism is set in the position of $L_4$ range (reduced-speed four-wheel drive mode).

The upper and lower end faces of the first spool 241 of the inhibitor valve 240, which face respectively the oil chamber 251 and lower oil chamber 248, have the same pressure receiving areas, so that when the spool is shifted to the upper position, admitting the governor pressure into both the oil chamber 251 and the lower oil chamber 248, it will not be shifted to the lower position and held in the upper position by the action of the spring 244 even if the governor pressure (or the vehicle speed) is increased, until the manual shift is set in the $H_2$- or $H_4$-range position to admit the line pressure into the oil chamber 252 or into the upper oil chamber 253. Therefore, in a case where the $L_4$-range is selected by the manual shift and established the gear position of $L_4$ range of the transfer mechanism upon a drop of the vehicle speed (or governor pressure) below a predetermined value, that gear position of $L_4$ range is maintained even after the vehicle speed (or governor pressure) is increased.

(2) Where the manual valve 105 in N- or P-range in which no governor pressure is fed to the valve means:

(E) When the manual shift selects $L_4$-range,
the 1st solenoid valve 210 is "ON", and
the 2nd solenoid valve 220 is "ON"

so that the line pressure which is led from the conduit 104 to the conduit 205 through orifice 340 is drained by the energized first solenoid valve 210, supplying no line pressure to the upper oil chamber 236. Therefore, the spool 231 of the change-over valve 230 is held in the upper position by the action of the spring 232, applying the line pressure to the oil chamber 252 of the inhibitor valve 240 from the conduit 104 through the oil chamber 234 and the fourth conduit 204, setting the second and first spools 242 and 241 of the inhibitor valve 240 in the respective lower positions. Consequently, the line pressure is fed to the hydraulic servomotor 70 of the clutch 7, and the oil pressure in the hydraulic servomotors 80 and 50 are drained through the drain ports 238 and 255, respectively. Thus, the transfer mechanism 10 is set in the gear position of $H_2$ range (two-wheel drive direct-coupling mode).

(F) When the manual shift selects $H_2$ range, or
(G) When the manual shift selects $H_4$ range,
the 1st solenoid valve 210 is "ON", and
the 2nd solenoid valve 220 is "OFF"

so that the line pressure is admitted into the upper oil chamber 253 of the inhibitor valve 240 in addition to the conditions in (E). However, the change-over valve 230 and inhibitor valve 240 are operated in the same manner, supplying the line pressure to the hydraulic servomotor 70 of the clutch 7 and draining the hydraulic servomotors 50 and 80 to set the transfer mechanism in the gear position of $H_2$ range.

With the above-described transfer mechanism, if the range of reduced-speed four-wheel drive mode is selected by the manual shift of the transfer mechanism during a high speed operation of the vehicle in the mode of two-wheel drive direct-coupling mode ($H_2$) or four-wheel drive direct-coupling mode ($H_4$), the first and second solenoid valves 210 and 220 are put in de-energized state and energized state, respectively, as shown in Table 2. However, during the high speed operation of the vehicle in $H_2$ or $H_4$ mode, the second solenoid valve 220 has been in de-energized state with its first spool 241 held in the lower position, so that, even if the oil pressure in the upper oil chamber 253 is drained upon energization of the second solenoid valve 220, the governor pressure in the oil chamber 251 holds the spool 241 continuatively in the lower position, overcoming the force of the spring 244 as long as the vehicle speed is higher than the predetermined value. Therefore, the transfer mechanism is maintained in the gear position of $H_4$ range and not changed into $L_4$ range until the governor pressure drops below the predetermined level.

However, in a high speed operation of the vehicle where the transfer mechanism is established in $H_4$ range, if the manual shift of the automatic transmission is set in D-range after once setting the same in N-range in which the feeding of the governor pressure is stopped, the governor pressure which has been prevailing in the oil chamber 251 of the inhibitor valve 240 is drained at the time when the manual shift is set in the N-range position, as a result shifting the spool 241 to the upper position by the action of the spring 244. As soon as the manual shift is set in the D-range position, the governor pressure is admitted into the oil chamber 251 as well as the lower oil chamber 248 through the oil port 245A in the sleeve-like land to hole the spool 241 in the upper position. In such a case, the transfer mechanism 10 is changed into the gear position of reduced-speed four-wheel drive range $L_4$, abruptly changing the mode of operation of the vehicle to reduced speed four-wheel during operation abruptly from a high speed driving operation in $H_4$ range.

In order to avoid such dangerous situations, the electric control circuit employed by the present invention includes means for supplying the first solenoid valve 210 with a signal indicative of the selection of N- or P-range by the manual shift of the automatic transmission, thereby holding the first solenoid valve 210 in energized state to feed the line pressure to the hydraulic servomotor 70 of the multiple disc clutch 7 irrespective of the mode selected by the manual shift of the transfer mechanism, as will be described in greater detail hereinafter.

Figure 5:
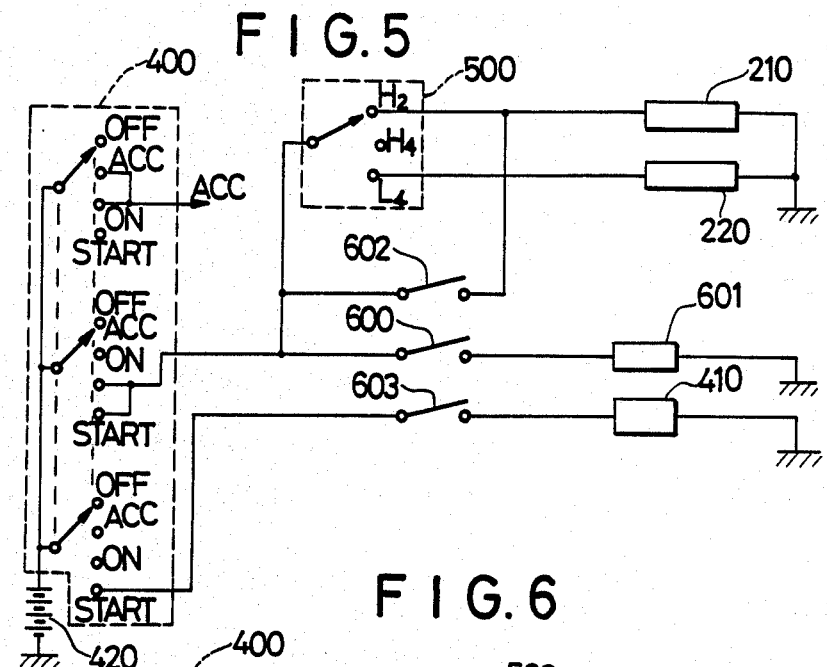
FIG. 5 is a diagram of an electric circuit for the control of the hydraulic control system.
Figure 6:
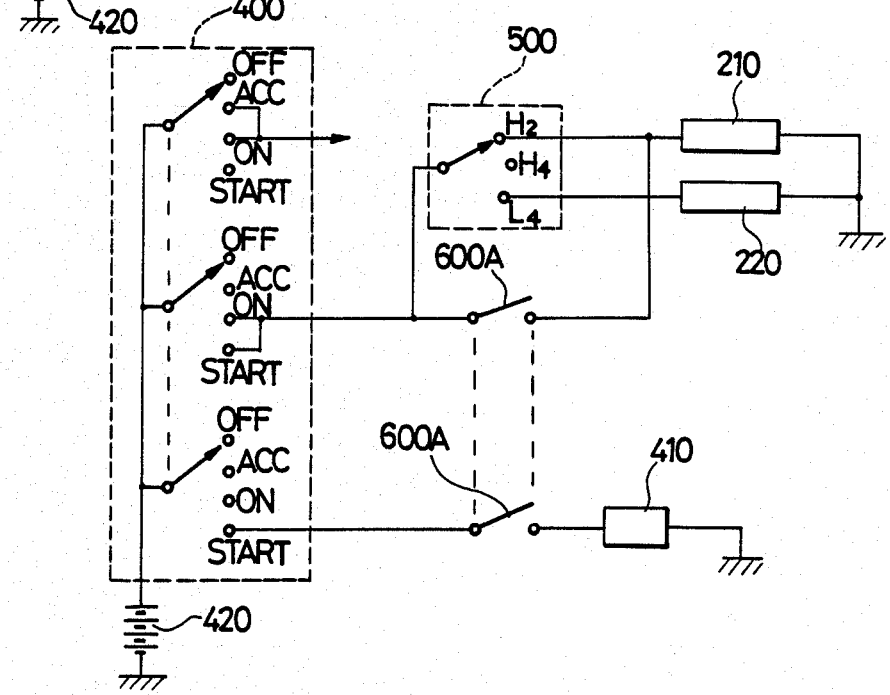
FIG. 6 is a view similar to FIG. 5 but showing another electric control circuit.

FIGS. 5 and 6 illustrate Example 1 and 2, respectively, of the electric circuit which energizes and de-energizes the first and second solenoid valves 210 and 220 as shown in Table 2 according to the selected range selected by the manual selector valve 105 of the automatic transmission and the mode of operation selected by the manual shift of the transfer mechanism 10.

EXAMPLE 1

The electric circuit includes an ignition switch 400, a starter motor 410, a battery 420 and a manual shift or a selector switch 500 for the transfer mechanism 10. Indicated at 600 is a neutral safety switch which permits to start the internal combustion engine only in N- and P-ranges of the automatic transmission, and is turned on by the shift lever of the automatic transmission when the N- or P-range is selected thereby, actuating a relay 601 and closing relay contacts 602 and 603 to energize ("ON") the first solenoid valve 210 irrespective of the mode of operation ($H_2$-mode, $H_4$-mode and $L_4$-mode) selected by the selector switch 500.

EXAMPLE 2

In this case, the relay 601 and relay contacts 602 and 603 are omitted by the use of a safety switch 600A for two circuits.

As clear from the foregoing description, the hydraulic control system for four-wheel drive torque transfer mechanism according to the present invention is arranged to set the transfer mechanism in the gear position of two-wheel drive direct-coupling range or four-wheel drive direct-coupling range regardless of the range selected by the manual shift of one 4-wheel torque transfer mechanism when the vehicle speed signal becomes absent upon selection of the N (neutral) or P (parking) range by the manual shift of the automatic transmission. Therefore, even if the manual shift of the transfer mechanism is set in the $L_4$ range and the manual shift of the automatic transmission is changed into D-range through the N-range position, temporarily stopping the feeding of the governor pressure, the transfer mechanism is not changed into the gear position of $L_4$ range (reduced-speed four-wheel drive mode). Thus, the hydraulic control system of the present invention can securely prevent the change of the gear position of the transfer mechanism into $L_4$ range during a high speed operation of a motor vehicle with a four-wheel drive torque transfer mechanism.

According to the above-described basic concept of the present invention, in a case where the vehicle speed signal becomes unavailable by setting the manual shift of the automatic transmission in the position of N (neutral) or P (parking) range, a shift signal indicative of the selection of the N- and P-ranges is supplied from a shift detection means to the hydraulic control system thereby to establish constantly the gear position of two-wheel drive direct-coupling or four-wheel drive direct-coupling range, that is to say, to change into the direct-coupling drive range if the transfer mechanism is in the reduced speed drive range. This basic concept of the invention can be modified such that, in a case where the manual shift of the automatic transmission is set in the position of N (neutral), P (parking) or other range in which the vehicle speed signal becomes unavailable, a shift signal indicative of the selection of the N- and P-ranges is supplied from a shift detection means to the hydraulic control system thereby to switch the transfer mechanism constantly into the gear position of two-wheel drive direct-coupling mode, that is to say, changing the reduced-speed drive mode into the direct-coupling drive mode and at same time switcing from four-wheel drive mode to two-wheel drive mode. This modification has additional advantages under the preconditions as stated below.

As seen from the embodiment shown, the parking mechanism (the stopper 74 and the parking gear 73 in the particular embodiment shown) is adapted to fix the first output shaft of the transfer mechanism when the shift lever of the automatic transmission is set in the position of P (parking) range. Therefore, with the automatic transmission in the P-range and the transfer in the gear position of H$_4$ or L$_4$ range, both the front and rear wheels of the vehicle are fixed by the engine is in operation. However, if the engine is stopped, the fixing action of the parking mechanism is effective only on the rear wheels, with dangerous variations in the fixing effect by the parking mechanism. Such variations in the fixing effect of the parking mechanism caused by on and off of the engine can be precluded in the above-mentioned modification which is adapted to set the transfer mechanism invariably in the gear position of H$_2$ range when the automatic transmission in the P-range position.

What is claimed is:

1. A hydraulic control system for a four-wheel drive torque transfer mechanism for a vehicle, comprising:
   an automatic transmission;
   a torque transfer mechanism connected to an output end of said transmission and including a frictional engagement means for four-wheel drive operation, a frictional engagement means for direct-coupling operation and a frictional engagement means for reduced-speed operation for selectively establishing said transfer mechanism in one of a two-wheel drive direct-coupling range, a four-wheel drive direct-coupling range and a reduced-speed four-wheel drive range gear position; and
   a hydraulic control circuit including shift means for establishing at least a drive range, a neutral range and a parking range of said automatic transmission, means for generating a vehicle speed signal commensurate with the speed of said vehicle, means for generating a range signal corresponding to the range selected by manual shift of said transfer mechanism, means for generating a position signal when said shift means for said automatic transmission establishes one of said neutral range and said parking range and control means for maintaining said transfer mechanism in the direct-coupling drive mode gear position while said vehicle speed signal is greater than a predetermined value, said position signal is generated and said range signal is of the reduced speed four-wheel drive mode, said control means changing said transfer mechanism into the gear position of the reduced-speed four-wheel drive mode only after the vehicle speed signal has become lower than said predetermined value and said position signal is not generated.

2. A hydraulic control system for a four-wheel drive torque transfer mechanism for a vehicle having a two-wheel drive direct-coupling mode, a four-wheel drive direct-coupling mode, and a reduced-speed four-wheel drive mode gear position, comprising:
   an automatic transmission;
   a transfer mechanism including a reduction gear mechanism connected to the output end of said automatic transmission, a first output shaft coupled with the output shaft of said reduction gear mechanism, a second output shaft rotationally connected and disconnected to said first output shaft through a link mechanism and a first fricitonal engagement means; a second frictional engagement means for releasably coupling the input shaft of said reduction gear mechanism with said first output shaft, and a third frictional engagement means for setting said reduction gear mechanism in the gear position of the reduced-speed drive mode; and
   a hydraulic control circuit including a manual shift valve for establishing at least a drive range, a neutral range and a parking range of said automatic transmission, a source of pressurized fluid, means for generating a speed signal commensurate with the speed of said vehicle, means for generating a range signal indicative of the mode selected by manual shift of said transfer mechanism, means for generating a position signal when said manual shift valve is shifted to establish one of said neutral range and said parking range, a first control valve means for supplying the pressurized fluid selectively to a servomotor of said first frictional engagement means in response to said range signal and said position signal, and a second control valve means for supplying the pressurized fluid selectively to a servomotor of either the second or third frictional engagement means in response to said speed signal, said position signal and said range signal, said second control valve means means supplying the pressurized fluid selectively to said servomotor of said second frictional engagement means in the presence of a speed signal indicating a speed higher than a predetermined value and a range signal indicating selection of the reduced-speed four-wheel drive range, and supplying the pressurized fluid to the servomotor of said third frictional engagement means to set said reduction gear mechanism in the reduced-speed drive mode gear position when said speed signal drops below said predetermined value and said position signal is absent.

3. The hydraulic control system according to claim 2, wherein said second control valve means is constituted by an inhibitor valve interposed between said source of pressurized fluid and the servomotor of said second and third frictional engagement means, said inhibitor valve including a slidable spool receiving a fluid pressure corresponding to the vehicle speed at one end thereof and having a biasing spring loaded on the other end opposingly to the fluid pressure of the speed signal, said spool being placed in a first position when the input speed signal is higher than said predetermined value thereby communicating said source of pressurized fluid with a first conduit leading to the servomotor of said second frictional engagement means and communicating a second conduit leading to the servomotor of said third frictional engagement means with a drain conduit, and in a second position when the input speed signal is lower than said predetermined value thereby communicating said second conduit with said source of pressurized fluid and connecting said first conduit with a drain conduit.

4. The hydraulic control system according to claim 3, wherein said spool of said second control valve means is formed with a sleeve-like land at the spring-loaded end and adapted to receive therein a fluid pressure corresponding to the vehicle speed through an opening in said sleeve-like land when being placed in said second position, said spool being shifted to and maintained in said second position when the speed signal drops below said predetermined level by the combined effect of said spring and said fluid pressure corresponding to the vehicle speed even after said speed signal exceeds said predetermined level.

5. The hydraulic control system according to claim 4, wherein said first control valve means is constituted by a change-over valve interposed between said source of pressurized fluid and the servomotor of said first frictional engagement means, and includes a slidable spool receiving a fluid pressure corresponding to said range signal applied to one end thereof and a biasing spring loaded on the other end opposingly to said fluid pressure of the range signal, said spool being placed in a first position in the presence of said range signal to communicate said source of pressurized fluid with a third conduit leading to the servomotor of said first frictional engagement means, and in a second position in the absence of said range signal to communicate said third conduit with a drain port.

6. The hydraulic control system according to claim 5, wherein said inhibitor valve is provided with a second spool in abutting engagement with said first spool, said second spool receiving at one end thereof said fluid pressure corresponding to the vehicle speed and at the other end a fluid pressure fed from a fourth conduit; and said change-over valve communicates said fourth conduit with said source of pressurized fluid when said spool of said change-over valve is in a second position connecting the servomotor of said first frictional engagement means to said drain conduit.

7. The hydraulic control system according to claim 6, wherein said inhibitor valve is further provided with a slidable third spool receiving at one end thereof a fluid pressure led from said fourth conduit and at the other end a fluid pressure corresponding to one of said range signals, said third spool placing said first spool in said first position through said second spool in response to fluid pressure corresponding to said range signal.

8. The hydraulic control system according to claim 7, wherein said system further comprising a first solenoid valve interposed between said change-over valve and said pressurized fluid source, and a second solenoid valve interposed between said inhibitor valve and said pressurized fluid source, said range signal being given by the presence and absence of fluid pressures to be applied to said change-over valve and said inhibitor valve from said pressurized fluid source through on-off operations of said first and second solenoid valves.

9. The hydraulic control system according to claim 2, wherein said first control valve means releases said first frictional engagement means when said position signal is generated.

* * * * *